May 24, 1932.   M. G. DUMAS   1,859,768
METHOD OF MOLDING HOLLOW CLAY BODIES
Filed Feb. 15, 1929   3 Sheets-Sheet 1
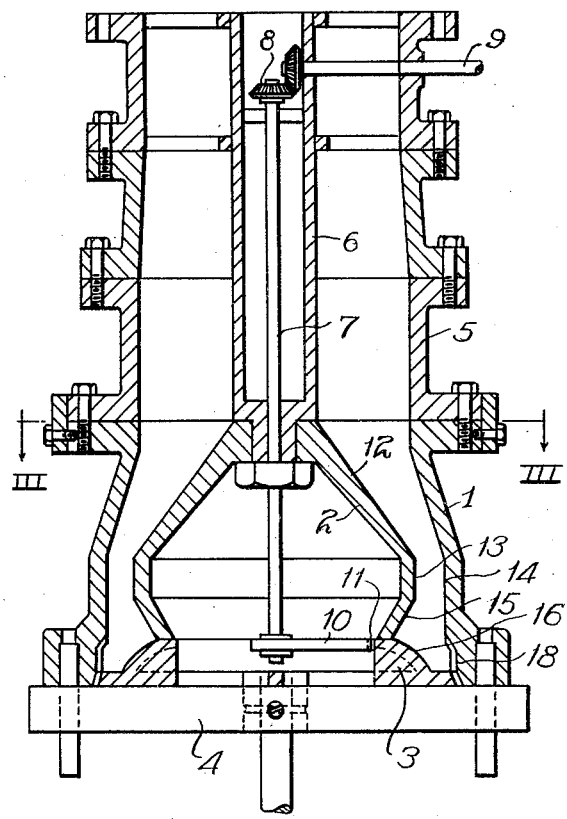
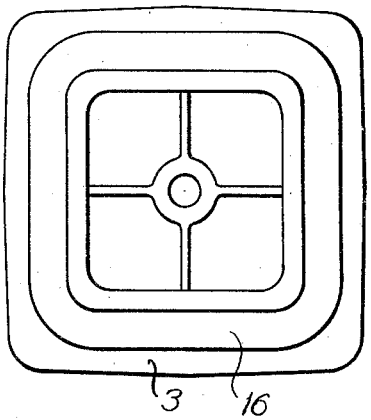
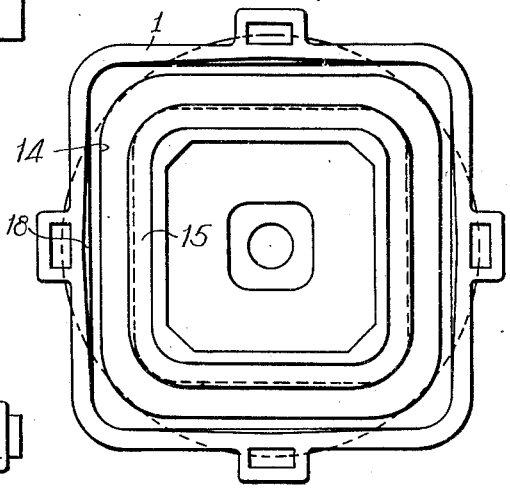
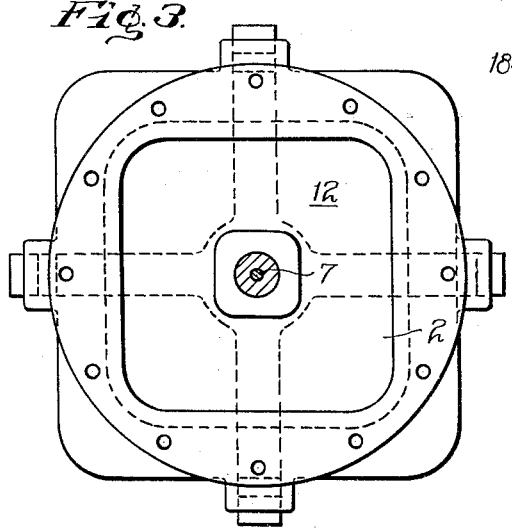
INVENTOR
Maxwell Gerson Dumas
by William B. Jaspert.
Attorney.

May 24, 1932.　　　　M. G. DUMAS　　　　1,859,768
METHOD OF MOLDING HOLLOW CLAY BODIES
Filed Feb. 15, 1929　　　3 Sheets-Sheet 2
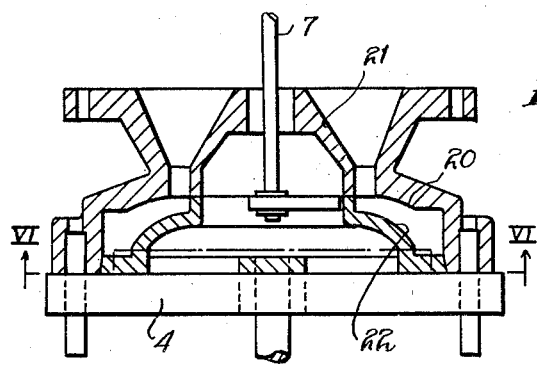
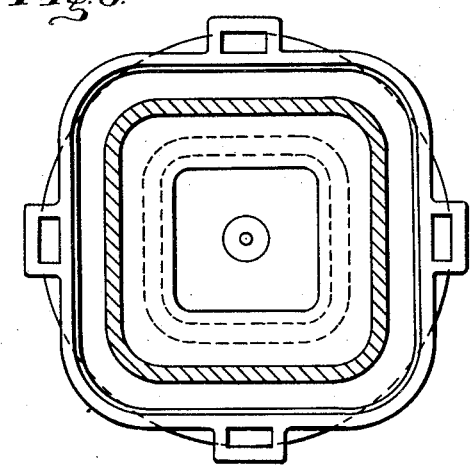
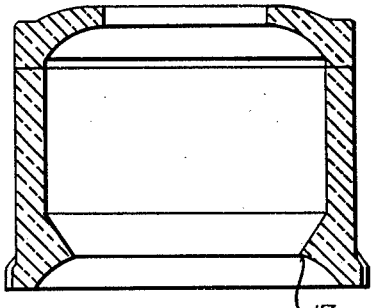
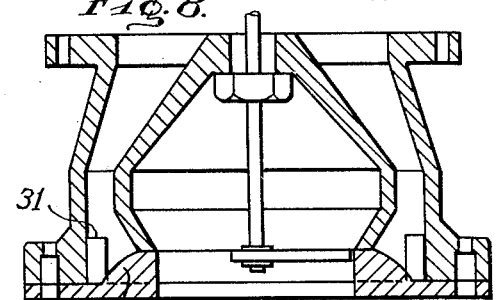
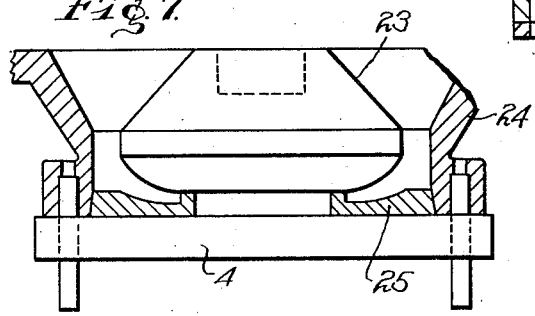
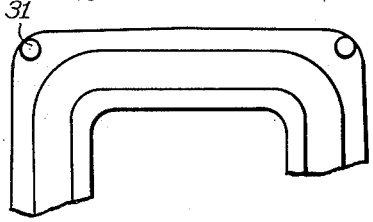
INVENTOR
Maxwell Gerson Dumas
By William B. Jasport
Attorney.

May 24, 1932. M. G. DUMAS 1,859,768
METHOD OF MOLDING HOLLOW CLAY BODIES
Filed Feb. 15, 1929 3 Sheets-Sheet 3
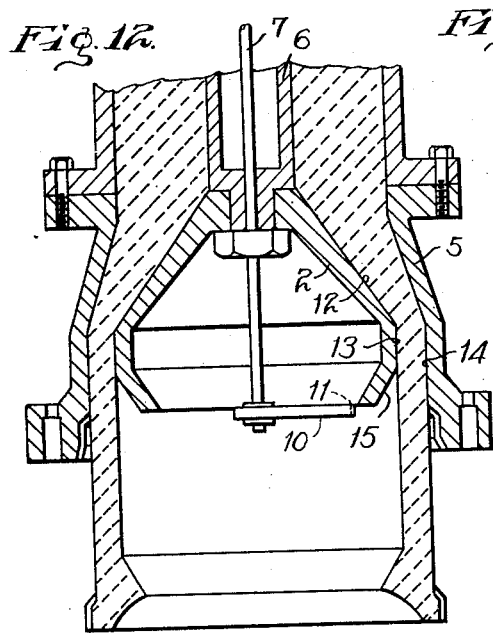
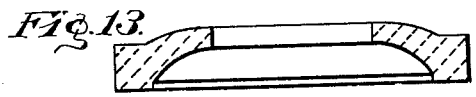
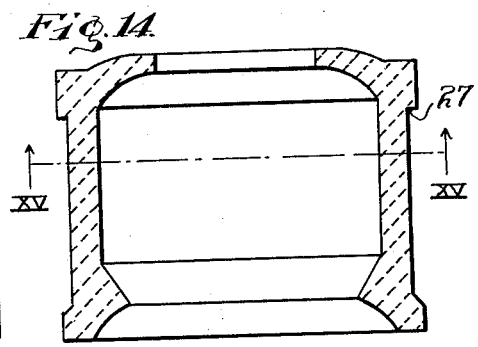
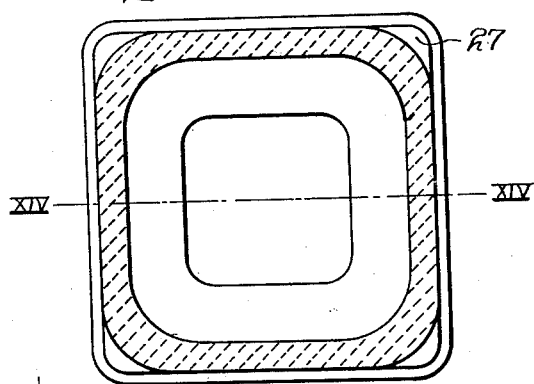
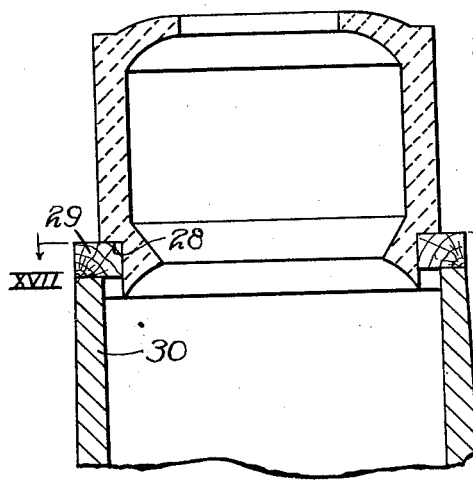
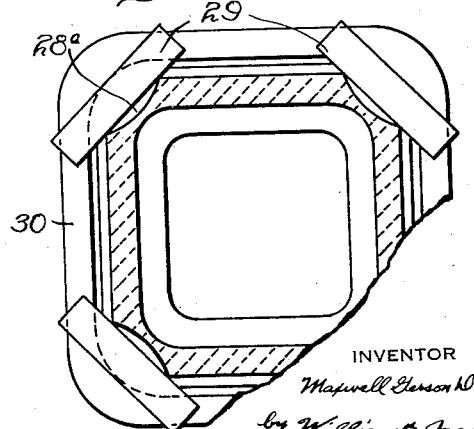
INVENTOR
Maxwell Gerson Dumas
by William B. Jaspert
Attorney Patented May 24, 1932

1,859,768

UNITED STATES PATENT OFFICE

MAXWELL GERSON DUMAS, OF PITTSBURGH, PENNSYLVANIA

METHOD OF MOLDING HOLLOW CLAY BODIES

Application filed February 15, 1929. Serial No. 340,218.

This invention relates to method of and apparatus for molding hollow clay bodies and more particularly for the molding of hot tops for ingot molds.

It is among the objects of this invention to provide a method of and apparatus for molding hot tops of irregular cross sections by the extrusion process, whereby the cost of manufacture is reduced to a minimum and the quality of the product is uniformly maintained in the manufacturing of production quantities.

In my Patent No. 1,692,491 granted November 20, 1928, is described a form of hot top having a constricted neck portion at the lower end therof and a curved heat deflecting top wall portion, all formed as an integral unit.

The present invention is directed to apparatus for forming hot tops of this nature in a simple and expedient manner, as will become apparent from a description of the accompanying drawings constituting a part hereof and in which like reference characters designate like parts.

In the drawings, Fig. 1 is a vertical sectional view of a portion of a molding press, a die, bell and former for making the main body portion of the hot top which embodies the principles of this invention; Fig. 2 is a top plan view thereof; Fig. 3 is a top plan view of the die member taken along the lines III—III, Fig. 1; Fig. 4 is a bottom plan view thereof; Fig. 5 is a vertical section partly in elevation of a die, bell and former for molding the top wall portion of the hot top which is integrally joined with the main body portion prior to the burning or firing operation; Fig. 6 is a view taken along the lines VI—VI, Fig. 5; Fig. 7 is a vertical sectional view of a die, bell and former for making the top in a similar manner as by the equipment shown in Fig. 5, with the distinction however that the material is caused to flow inwardly in forming the article, whereas in Fig. 5 it flows outwardly; Fig. 8 is a vertical sectional view of the die, bell and former of Fig. 1, illustrating a plurality of plungers cooperating with the former to form recesses in the body of the hot top; Fig. 9 is a top plan view of the former shown in Fig. 5; Fig. 10 is a cross sectional view of a complete hot top; Fig. 11 is a cross sectional view of the top portion after molding as it appears when removed from the press or molding apparatus shown in Fig. 7; Fig. 12 is a cross sectional view of the press and die member showing the hot top in its extruded position prior to being severed by the cutting off knife; Fig. 13 is a cross sectional view of the top portion of the hot top as it appears when removed from the mold shown in Fig. 5; Fig. 14 is a cross sectional view taken along the lines XIV—XIV of Figure 15, illustrating the supporting lugs or corners formed in a manner to be hereinafter described; Fig. 15 is a longitudinal sectional view of the completed hot top taken along the lines XV—XV, of Fig. 14; Fig. 16 is a cross sectional view of the hot top supported on the top of an ingot mold, a portion of which is shown; and Fig. 17 is a plan view partly in section of the hot top shown in Fig. 16 taken along the line XVII—XVII thereof.

Referring to Fig. 1 of the drawings, the structure therein illustrated comprises a die member 1, a bell 2, a former 3, and a vertically movable support 4 which latter is adapted to carry the former 3. The die member 1 is secured to a hopper 5 which is built up in sections and constitutes a portion of the press for pressing clay material into the die member. The hopper 5 is provided with a central column 6 that is hollow and adapted to journal a cutting-off spindle 7 which is rotated through a bevel gear connection 8 by a power shaft 9 which may be actuated in any suitable manner.

The lower end of the spindle 7 carries a severing member or knife 10 which is in the plane of the joint where the bell 2 and former 3 separate. The severing member 10 is in the form of a jack knife the blade or cutting portion of which is hinged at 11 whereby the blade flies out to sever the clay body when the spindle 7 is rotated in one direction and folds up in the position shown in Fig. 1 when the spindle is rotated in the opposite direction.

The upper face 12 of the bell and the inner face of the upper portion of the die are formed to constitute converging wall members through which the clay is pressed into the space constituted by the straight wall portions 13 and 14 of the bell and die respectively, this being the narrowest section of the clay body which forms the main body portion or wall of the finished hot top shown in Fig. 10.

The lower portion 15 and the upper curved portion 14 of the bell and former respectively converge to form a neck 17, Fig. 10, in the body of the hot top, the lower portion of the die being recessed at 18 to form a bead on the end of the hot top which is lowered into the ingot mold.

In the molding operation the clay mixture is pressed down through the hopper 5 into the die and fills the space between the die, bell and former, as illustrated, and when the molding operation is completed, the movable support 4 is lowered, carrying the former 3 with it and the subsequent application of pressure on the clay body in the hopper will cause the formed body to be extruded in the manner illustrated in Fig. 12. The extruding process determines the height of the hot top wall and when the desired height is extruded, the cutting spindle 7 is rotated in the direction in which the jack knife opens to cut the clay body in line with the lowered edge of the bell. The formed body is then removed and the former is brought against the bell by the movable support 4 for another molding operation.

In Fig. 5 is illustrated a die 20, a bell 21, and a former 22 cooperating in the manner of the molding device of Fig. 1 to produce the heat deflecting top member of the hot top as is shown in Fig. 13 of the drawings. The shape of the top portion is determined by the form of the bell, die and former and when the clay mass is molded in the space between these elements, the former 22 is lowered by the movable support 4, thus exposing the molded block which is extruded and cut off by the knife in the manner hereinbefore explained to form the article shown in Fig. 13.

In the process employed with the apparatus shown in Fig. 5, the clay mass flows outwardly into the die but the top member may be formed by causing the clay body to flow inwardly by a mold of the character illustrated in Fig. 7, in which the shape of the bell 23, die 24 and former 25 is such as to produce the element shown in Fig. 11, which is identical with that of Fig. 13, but in the position in which it is removed from the die.

The body portion formed by means of the press and die shown in Fig. 1, and the separate top elements shown in Figs. 11 and 13 are joined by placing the top portion on the side wall of the body in intimate contact in the manner shown in Fig. 10. This is done when the molded articles come from the press and when so joined, they are subjected to a burning or firing operation which joins the members to form an integral hot top structure.

Hot tops for ingot molds are either suspended in the ingot mold or supported on top of the mold, but in either case provision must be made to support the hot top on the upper edge of the ingot mold; where the hot top is to be suspended in the inogt mold, provision is made to place a support intermediate the upper portion of the hot top body and the top of the ingot mold and by forming the top and main body portion of the hot top separately, as herein described, such a supporting shoulder may be formed by shaping the top member in a manner to form an overhanging edge or shoulder 27, Figs. 14 and 15, said shoulder being formed at the corners as shown in Fig. 15. By having the overhanging portion 27 on the corners of the top, they are constituted shoulders on the hot top member after being integrally joined with the main body portion thereof. In mounting the hot top for use on the ingot mold, this shoulder serves to receive wooden blocks or other supporting elements which are disposed between the shoulder 27 and the upper face of the ingot mold. Where it is desired to support the hot top on top of the ingot mold in the manner illustrated in Figs. 16 and 17, a shoulder or recess 28 may be formed for receiving wooden blocks 29 which rest on the top edge of the ingot mold 30. These recesses 28a may likewise be formed on the corner portions of the hot top as is shown in the cross sectional view of Fig. 17 and they may be recessed in the molding operation by providing plungers 31 on the former 32 in the manner illustrated in Fig. 8 of the drawings. These plungers form the recesses in the side wall of the hot top which serve as shoulders for the supporting block 29 when the hot top is placed on the ingot mold ready for pouring.

It is evident from the foregoing description of this invention that hot tops formed in accordance therewith may be manufactured in production quantities and at a minimum cost without requiring hand labor in their construction. Furthermore, by the machine method of molding, such hot tops can be made of uniform quality in production quantities.

Although one embodiment of the invention has been herein illustrated and described, it will be obvious to those skilled in the art that various modifications may be made in the details of construction without departing from the principles herein set forth.

I claim herein as my invention:

1. The method of forming hot tops which comprises molding and extruding the main body portion thereof, molding the top portion separately, placing said portions in intimate contact and joining said portions to form an integral hot top structure.

2. The method of forming hot tops which comprises molding and extruding the main body portion to the size of the article to be formed, molding the top portion thereof to a size greater than said main body portion and joining the members so formed to constitute an integral hot top having shoulders at the joint of connection of the separately formed portions.

In testimony whereof I have hereunto set my hand and seal this 14 day of February, 1929.

MAXWELL GERSON DUMAS.